(12) United States Patent
Grove

(10) Patent No.: US 6,648,408 B1
(45) Date of Patent: Nov. 18, 2003

(54) SECOND SEAT ASSEMBLY FOR A MOTORCYCLE

(76) Inventor: James E. Grove, 4316 Marina City Dr. #423CTN, Marina del Rey, CA (US) 90292

( * ) Notice: Subject to any disclaimer, the term of this patent is extended or adjusted under 35 U.S.C. 154(b) by 0 days.

(21) Appl. No.: 10/274,238

(22) Filed: Oct. 17, 2002

(51) Int. Cl.[7] .................................................. B62J 1/14
(52) U.S. Cl. .............................. 297/195.13; 297/440.22
(58) Field of Search ....................... 297/195.12, 195.13, 297/440.22

(56) References Cited

U.S. PATENT DOCUMENTS

| | | | |
|---|---|---|---|
| 3,269,773 A | * | 8/1966 | O'Connor ................ 297/214 |
| 3,791,563 A | * | 2/1974 | Raat ........................ 224/457 |
| 4,051,985 A | * | 10/1977 | Berger ..................... 224/415 |
| 4,257,544 A | | 3/1981 | Dierkes |
| 4,349,138 A | | 9/1982 | Bruhn |
| 4,466,660 A | | 8/1984 | Mabie |
| 4,570,998 A | | 2/1986 | Hughes |
| 4,690,237 A | | 9/1987 | Funabashi et al. |
| 4,993,731 A | | 2/1991 | Fuller |
| 5,147,077 A | | 9/1992 | Nakajima et al. |
| 5,299,832 A | | 4/1994 | Price, Sr. |
| 5,322,345 A | * | 6/1994 | Desser et al. ............ 297/214 |
| 5,443,239 A | * | 8/1995 | Laporte ................... 248/503.1 |
| 5,465,882 A | | 11/1995 | Shinohara |
| 5,533,783 A | * | 7/1996 | Harms et al. ........... 297/195.13 |
| 5,558,260 A | | 9/1996 | Reichert |
| 5,664,715 A | | 9/1997 | Gogan et al. |
| 5,667,232 A | | 9/1997 | Gogan et al. |
| 5,779,303 A | | 7/1998 | Kuelbs et al. |
| 5,931,360 A | | 8/1999 | Reichert |
| D415,980 S | | 11/1999 | Wright |
| 5,984,331 A | | 11/1999 | Wright |
| 6,007,150 A | | 12/1999 | Clerkin et al. |
| D439,215 S | | 3/2001 | Kahmann |
| 6,347,804 B1 | | 2/2002 | Seibel |
| 6,378,643 B1 | | 4/2002 | Galbraith et al. |
| 6,443,344 B1 | * | 9/2002 | Nicosia et al. ............ 224/413 |

FOREIGN PATENT DOCUMENTS

| | | | |
|---|---|---|---|
| JP | 02147484 A | * | 6/1990 |
| JP | 04325385 A | * | 11/1992 |

* cited by examiner

Primary Examiner—Peter M. Cuomo
Assistant Examiner—Joseph Edell
(74) Attorney, Agent, or Firm—Jack C. Munro

(57) ABSTRACT

A second seat assembly for a motorcycle which is removably mounted over a rear fender located above the rear wheel of a motorcycle. The second seat assembly is attached by hook members which engage with recesses formed in fender struts that are mounted in conjunction with the fender. The second seat assembly is tightly secured to avoid vibration and noise in the mounting of the second seat assembly on the motorcycle.

9 Claims, 2 Drawing Sheets

US 6,648,408 B1

SECOND SEAT ASSEMBLY FOR A MOTORCYCLE

BACKGROUND OF THE INVENTION

1. Field of the Invention

This invention pertains to second seat assemblies which are to be removably mounted in conjunction with the rear fender of a motorcycle located behind the operator seat of the motorcycle.

2. Description of the Related Art

In the past, many different types of motorcycle accessories can be attached and detached from a motorcycle for the purpose of changing the functionality of the motorcycle. Motorcycles are generally manufactured with a single operator seat. Such a motorcycle is not designed to carry a passenger. To overcome this deficiency, there have been designed operator seats which includes an aft extension on which a passenger may sit.

Owners of motorcycles are generally very concerned about the look of the motorcycle. A motorcycle that has a passenger seat has a somewhat different look than a motorcycle without a passenger seat. A motorcycle operator may only carry a passenger a small percentage of the time when the motorcycle is operated. Therefore, that operator will not normally want the motorcycle to have "the look" of including the second seat one hundred percent of the time when the motorcycle is only used to carry a passenger infrequently.

In the past, one way to compensate for this problem was to have a second seat for the motorcycle that could be attached and detached relative to the motorcycle. Traditionally, the most common ways to attach and detach a second seat to the motorcycle was to bolt, screw or otherwise permanently attach the second seat to attachment points on the motorcycle. Therefore, in order to mount the second seat on the motorcycle, the operator of the motorcycle would have to use a wrench, screwdriver or other similar tool to achieve the attachment and detachment of the second seat. One of the problems with this arrangement is that the necessary tools may not be readily available to the operator of the motorcycle, such as when he or she is touring on the open road. Additionally, the attachment and detachment can be particularly time consuming particularly if the attachment points for the second seat are located behind or underneath a fender strut or under a seat or at some other inaccessible location. Additionally, the mounting hardware for the second seat might possibly be easily lost or misplaced.

Further, the including of appropriate attachment points in conjunction with the motorcycle generally involves the producing of protruding bolts or the producing of screw holes. Both modifications to the motorcycle deter from the overall look of the motorcycle. Owners of the motorcycle find the producing of such modifications to be undesirable. The producing of a second seat that can be attached and detached to a motorcycle without the use of tools is a desirable feature. However, even more desirable is that when the second seat is removed from the motorcycle, the motorcycle can have precisely the same look as a motorcycle that has no provision for mounting a second seat. There are no protruding bolts or screw holes formed anywhere on the motorcycle that are readily observable. One of the primary objectives of the present invention is to produce a way for mounting of the second seat in conjunction with a motorcycle where the structure that is used for the mounting is not observable when the second seat is not used.

SUMMARY OF THE INVENTION

The first basic embodiment of the present invention is directly related to a second seat for a motorcycle which is to be mounted in conjunction with the fender strut located alongside of a fender of a motorcycle. The fender strut includes a forward recess and an aft recess formed within an upper surface of the fender strut so each recess is not observable from a side location. A second seat has a pair of first hook members and a pair of second hook members. The first hook members are adjustable in position. A single second hook member is to engage with a single forward recess and a single first hook member is to engage with a single aft recess. The second seat is then locked to the fender strut by the engagement with the hook members.

A further embodiment of the present invention is where the first basic embodiment is modified by the first hook members being adjustable longitudinally in a direction generally parallel to the longitudinal axis of the second seat.

A further embodiment of the present invention is where the first basic embodiment is modified by the first hook members being spring biased constantly toward a locking position.

A further embodiment of the present invention is where the first basic embodiment is modified by there being mounted a first locking pin in each aft recess with each first hook member to engage with a first locking pin when the second seat is mounted on the motorcycle.

A further embodiment of the present invention is where the first basic embodiment is modified by the including within each forward recess a second locking pin and a binding pin. A second hook member is to be tightly captured between a second locking pin and a binding pin when the second seat is mounted on the motorcycle. This tightly capturing position eliminates vibrationally caused movement of the second seat and noise emitted therefrom.

A further embodiment of the present invention is where the just previous embodiment is modified by the binding pin being constructed of a nylon material.

A second basic embodiment of the present invention comprises a second seat assembly for a motorcycle where the motorcycle has a fender strut which is located on each side of a fender. Each fender strut is defined as having a forward recess and an aft recess formed within an upper surface of the fender strut. Each aft recess includes a first locking pin. Each forward recess includes a second locking pin and a binding pin. There are hook members that are mounted on the second seat which are to engage respectively with each recess and with the locking pins.

A further embodiment of the present invention is where the second basic embodiment is modified by there being a second hook member for each aft recess.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF THE INVENTION

Figure 1:
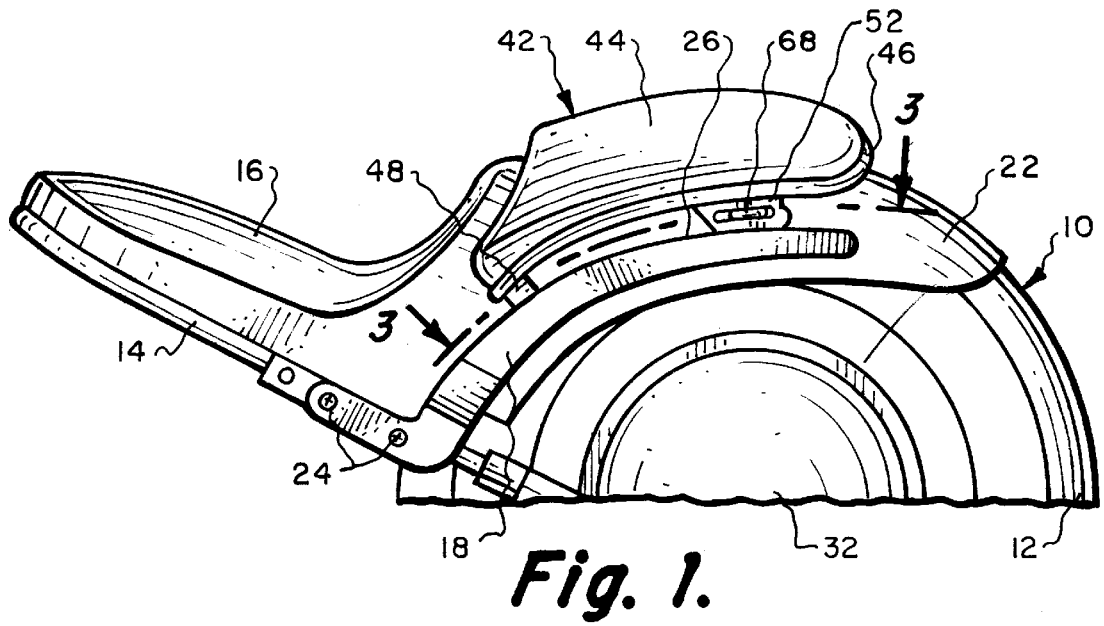
FIG. 1 is a side elevational view of the rear portion of a motorcycle upon which has been mounted the second seat of the present invention.

Referring particularly to the drawings, there is shown a motorcycle rear wheel 10 which includes a tire 12. Mounted on the frame, which is not shown, of the motorcycle is an operator's seat frame 14. The operator's seat frame 14 has mounted thereon an operator seat 16. Fixedly mounted onto the operator's seat frame 14 are a pair of fender struts 18 and 20. Mounted between the fender struts 18 and 20 is a fender 22. The fender 22 is located in a spaced relation over the tire 12. The mounting of the struts 18 and 20 to the operator's seat frame 14 is by means of conventional bolt fasteners 24.

Fender strut 18 is located on the left side of the rear wheel 10 with fender strut 20 being located on the right side of the rear wheel 10. The fender struts 18 and 20 are basically similar in shape except that fender strut 18 is a mirror image of fender strut 20. Both of the fender struts 18 and 20 have a basically arcuate smoothly contoured configuration which includes a top surface 26. The thickness of each fender strut 18 and 20 will normally be about one inch to one inch and a quarter.

Formed within the top surface of each fender strut 18 and 20 are an aft recess 28 and a forward recess 30. The aft recesses 28 and the forward recesses 30 are in alignment with each other, and if a line were drawn between the aft recesses 28 it would be parallel to a similar such line between the forward recesses 30 with both of these lines parallel to the rotational axis 32 of the motorcycle rear wheel 10. Generally, both of the recesses 28 and 30 are no more than an inch and one half to two inches in length and generally about one-half to three-quarters of an inch deep.

Fixedly mounted within each strut 18 and 20 and located crosswise within the aft recess 28 is first locking pin 34. The mounting of the first locking pin 34 within the recess 28 is such that there is always a certain amount of space located about the locking pin 34. In a similar manner within each forward recess 30, there is mounted a second locking pin 36. Again, there is a certain amount of space located about the second locking pin 36. Also mounted parallel to the second locking pin 36 within the forward recess 30 is a binding pin 38. The binding pin 38 is located spaced from the second locking pin 36 and is located in a rearward direction from the second locking pin 36. The rearward direction would be toward the free outer end of the struts 18 and 20. The binding pin will normally be constructed of a rigid yet not hard material. One particular desirable material would be a nylon. However, it is to be considered within the scope of this invention that the binding pin 38 could be constructed of other material, such as a plastic, possibly even rubber or a soft metal. The binding pin 38 is mounted against the aft face 40 of each recess 30.

Second seat 42 has an exterior surface which includes a soft pad 44. The second seat 42 includes a second seat frame 46. Integrally mounted to the second seat frame 46 are a pair of forward hook members 48. These hook members 48 are in alignment with each other along a line which is again parallel to the rotational axis 32. Each forward hook member 48 includes a hook cavity 50. The open end of the hook cavity 50 faces opposite the aft face 40, in other words, toward the front of the motorcycle.

Integrally mounted onto the second seat frame 46 is a mounting bracket 52. It is to be understood that there are two in number of the mounting brackets 52, one on one side of the second seat 42 and the other one on the opposite side of the second seat 42. Again, a line interconnecting the mounting brackets 52 will be located parallel to the rotational axis 32. Each mounting bracket 52 includes a forward slot 54 and an aft slot 56. A pin 58 is mounted within the forward slot 54. A similar pin 60 is mounted within the aft slot 56. Pins 58 and 60 are basically of the same diameter, approximately one-quarter of an inch, and are of the same length. Each of the pins 58 and 60 are integrally mounted onto a hook body 62 of an aft hook member. The hook body 62 includes a hook cavity 64. The hook cavity 64 has an open end that faces directly toward aft face 66 of the aft recess 28. The width of the cavity 64 is just slightly greater than the diameter of the first locking pin 34. In a similar manner, the width of the hook cavity 60 is just slightly greater than the diameter of the second locking pin 36. Fixedly mounted to the free end of the pins 58 and 60 is a handle 68. It is to be understood that there is to be a separate handle 68 for each hook body 62.

Figure 4:
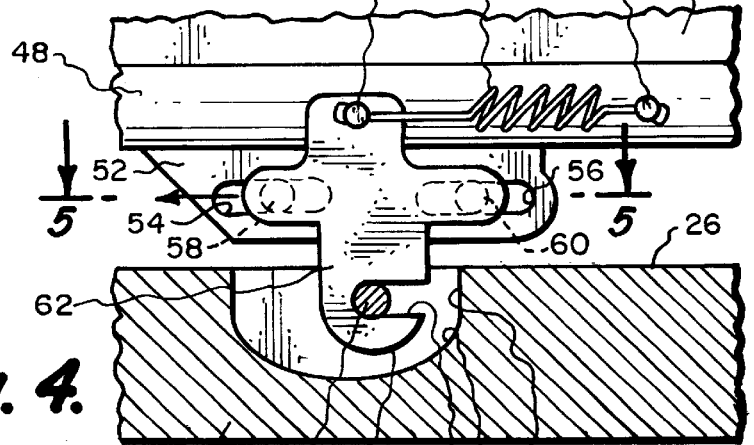
FIG. 4 is a cross-sectional view through one of the aft recesses included within one of the fender struts taken along line 4—4 of FIG. 3 clearly showing the adjustable hook member that is used in conjunction with the locking pin that is mounted in conjunction the aft recess.
Figure 5:
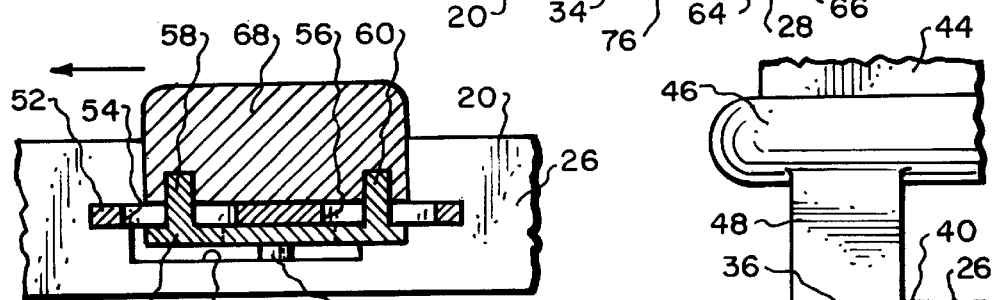
FIG. 5 is a cross-sectional view taken along line 5—5 of FIG. 4 showing in more detail the adjustable hook member utilized in conjunction with the aft recess of a fender strut.
Figure 6:
FIG. 6 is a cross-sectional view taken along line 6—6 of FIG. 3 showing in more detail the hook member arrangement utilized in conjunction with the forward recess of a fender strut.

A coil spring 70 is to be connected between rivet 72 mounted on the second seat frame 46 and a rivet 74 that is mounted on the hook body 62. The coil spring 70 exerts a continuous bias on the hook body 62 tending to locate such in a locking position, which is clearly shown in FIG. 4 of the drawings. However, application of a manual force against each handle 68, as there is a separate handle 68 for each hook body 62, will result in each hook body 62 being moved in a forward direction to an unlocking position. This type of movement is what to occur by the operator in order to disengage each of the first locking pins 34 from their respective hook cavity 64 and permit the second seat 42 to be pivoted from the installed position, shown in FIG. 1, to a substantially vertical partially extracted position, shown in dotted lines in FIG. 2.

Figure 2:
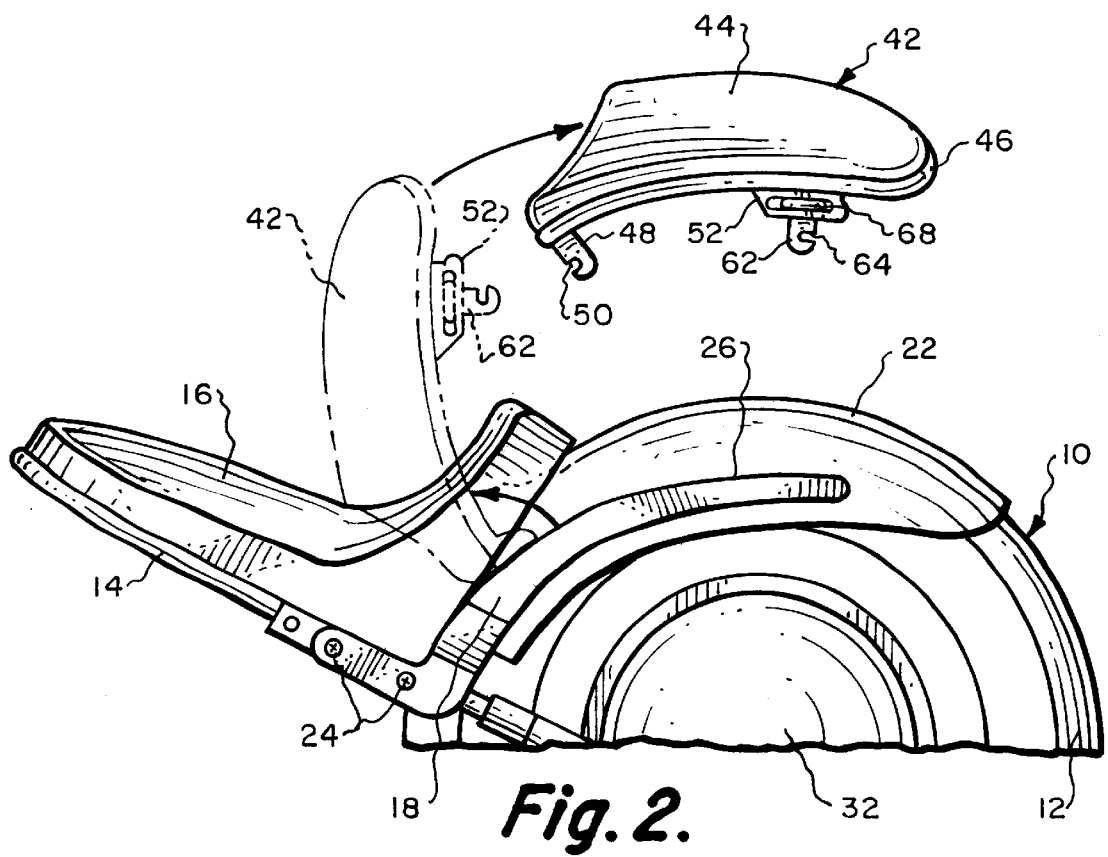
FIG. 2 a side elevational view similar to FIG. 1 but showing the disconnection and/or connection of the second seat in conjunction with the fender struts of the motorcycle.
Figure 3:
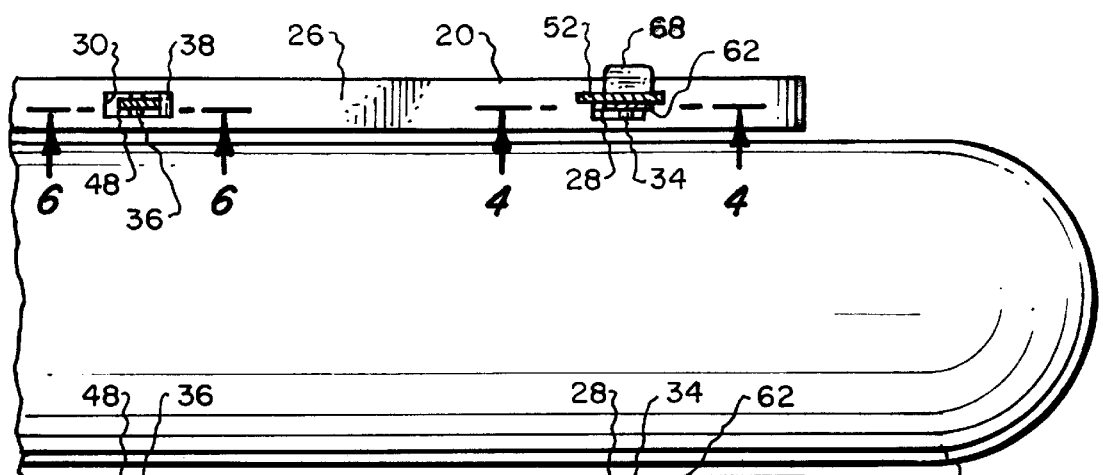
FIG. 3 is a top plan view, partly in cross-section, of the fender and fender struts of the motorcycle showing the mounting arrangement for the second seat in conjunction with the fender struts f the motorcycle.

It is to be noted that in order to remove the second seat 42 that the second seat 42 must be pivoted to the vertical position, shown in dotted lines in FIG. 2. It is only when in this position that the second locking pins 36 can be disengaged each from their respective hook cavity 50 which will permit vertical upward movement of the second seat 42 which will disengage each of the forward hook members 48 from their respective forward recess 30. The fact that the second seat 42 can only be disengaged from the struts 18 and 20 when the second seat 42 is vertical, constitutes a safety feature that prevents unauthorized detachment. In other words, the only time the second seat 42 could be disengaged is when no person is occupying the second seat 42. Accidental disengagement is absolutely prevented. After the second seat 42 has been so disengaged, the operator will be able to place a small cap plug, which is not shown, within each of the recesses 28 and 30 which will cover each of the now open recesses 28 and 30 and provide a smooth solid looking appearance providing a smooth upper surface for the top surface 26 hiding of the recesses 28 and 30. Therefore, when the second seat 42 is not being used, there is no shown structure that is used to mount the second seat 42.

It is to be understood that when it is desired to reconnect the second seat 42 to the fender struts 18 and 20 that these cap plugs, that are not shown, will be removed thereby exposing each of the recesses 28 and 30. The operator then places the forward hook members 48 within each of their respective recesses 30 while the second seat 42 is in the dotted line position, shown in FIG. 2. The operator will then pivot the second seat 42 approximately ninety degrees which will cause the forward hook members 48 to be tightly bound between each of the second locking pins 36 and their respective directly adjacent binding pin 38. This will create essentially a vibration and noise free interconnection. As the operator moves the second seat 42 to a substantially horizontal position, the cam surface 76 of each hook body 62 will be pressed against their respective first locking pin 34. As the second seat 42 is moved in a downward direction, the cam surface 76 will ride over its respective first locking pin 34 which will result in the hook body 62 being moved from a locking position to an unlocking position. Once the first locking pin 34 connects with its respective hook cavity 64, the bias of the spring 70 will automatically cause the hook body 62 to be moved from the unlocking position to the locking position with the pin 58 slidingly moving within the forward slot 54 and the pin 60 being slidingly movable within the aft slot 56. This will result in each first locking pin 34 being tightly seated within its respective hook cavity 64 and will remain in that position establishing again a vibration and noise free relationship between each first locking pin 34 and each hook body 62. The second seat 42 is now completely installed in position for usage with the operator of the motorcycle seating on operator seat 16 and the passenger being seated on pad 44.

What is claimed is:

1. A second seat assembly for a motorcycle which has a pair of fender struts each of which has an elongation, said fender struts are spaced apart and substantially parallel with one fender strut located to one side of a fender and another fender strut located to another side of the fender, said second seat assembly comprising:

each said fender strut having an upper surface and a lower surface which are connected by side surfaces, said upper surface being spaced furthest from a supporting surface which supports the motorcycle, a forward recess and an aft recess formed within said upper surface of each said fender strut so each said recess is not observable from a side location; and a second seat having a pair of first hook members and a pair of second hook members, said first hook members being adjustable in position, a single said second hook member to engage with a single said forward recess, a single said first hook member to engage with a single said aft recess, whereby said second seat is to be locked to the fender struts by the engagement of said first hook members and said second hook members with the fender struts.

2. The second seat assembly as defined in claim 1 wherein:

adjustability of said first hook members being accomplished by longitudinally moving in a direction parallel to said elongation of each said first hook member relative to said second seat between a locking position and an unlocking position, during connecting of said second seat with said motorcycle and removing of said second seat from said motorcycle said first hook members to be temporarily moved to said unlocking position.

3. The second seat assembly as defined in claim 2 wherein:

each of said first hook members being continuously biased toward said locking position.

4. The second seat assembly as defined in claim 3 wherein:

said second seat having a longitudinal dimension, each of said first hook members being movable in a linear direction substantially in alignment with said longitudinal dimension during movement of said first hook members between said locking position and said unlocking position.

5. The second seat assembly as defined in claim 1 wherein:

each said aft recess including a first locking pin fixedly mounted in said aft recess, each said first hook member to connect with a said first locking pin.

6. The second seat assembly as defined in claim 5 wherein:

each said forward recess including a second locking pin and a binding pin, both said second locking pin and said binding pin being fixedly mounted within said forward recess, said second hook member to be tightly captured between said second locking pin and said binding pin to eliminate vibrationally caused movement of said second seat and noise emitted therefrom.

7. The second seat assembly as defined in claim 6 wherein:

said binding pin being constructed of nylon.

8. A second seat assembly for a motorcycle which has a pair of struts each of which has an elongation, said fender struts are spaced apart and substantially parallel with one fender strut located to one side of a fender and another fender strut located to another side of the fender, said second seat assembly comprising:

each said fender strut having an upper surface and a lower surface which are connected by side surfaces, said upper surface being spaced furthest from a supporting surface which supports the motorcycle, a forward recess and said aft recess formed within an upper surface of each said fender strut so each said recess is not observable from a side location; and each said aft recess including a first locking pin fixedly mounted relative to said aft recess and extending across said aft recess, each said forward recess including a second locking pin and a binding pin with both said locking pin and said binding pin being fixed relative to said forward recess and extending across said forward recess, a hook member to be tightly captured between said second locking pin and said binding pin to eliminate vibrationally caused movement of said second seat and noise emitted therefrom, said hook member being mounted on said second seat.

9. The second seat assembly as defined in claim 8 wherein:

said binding pin constructed of nylon.

* * * * *